United States Patent [19]

Keller et al.

[11] Patent Number: 4,761,191
[45] Date of Patent: Aug. 2, 1988

[54] METHOD OF FORMING CLOSELY SIZED OPENINGS

[75] Inventors: George O. Keller, Spring; Joseph J. Portugal; Robert F. Kane, both of Houston, all of Tex.

[73] Assignee: TRW Inc., Cleveland, Ohio

[21] Appl. No.: 945,837

[22] Filed: Dec. 23, 1986

[51] Int. Cl.⁴ .......................... C21D 1/68; B21K 5/02
[52] U.S. Cl. ................................ 148/12 R; 148/134; 76/108 A; 29/447; 29/525
[58] Field of Search ............ 76/101 R, 101 E, 108 A, 76/108 R, DIG. 11; 148/12 R, 134; 29/525, 447

[56] References Cited

U.S. PATENT DOCUMENTS 3,190,380  6/1965  Anderson ........................ 76/108 R

FOREIGN PATENT DOCUMENTS 56425  4/1985  Japan ........................... 29/447

Primary Examiner—L. Dewayne Rutledge
Assistant Examiner—George Wyszomierski
Attorney, Agent, or Firm—Fay, Sharpe, Beall, Fagan, Minnich & McKee

[57] ABSTRACT

A method of forming precision openings in hardened steel workpieces is disclosed. The method generally includes drilling nominal size openings in the workpiece while it is in a soft condition. Thereafter, sizing plugs formed from a material having a strength greater than that of the steel body during a predetermined range of temperatures are press-fitted in the openings. With the plugs in position, the body is heat treated to harden it. Subsequently, the plugs are removed and the resulting openings are found to be of an extremely uniform size without the wide variations present when hardening is performed without the sizing plugs.

15 Claims, 1 Drawing Sheet

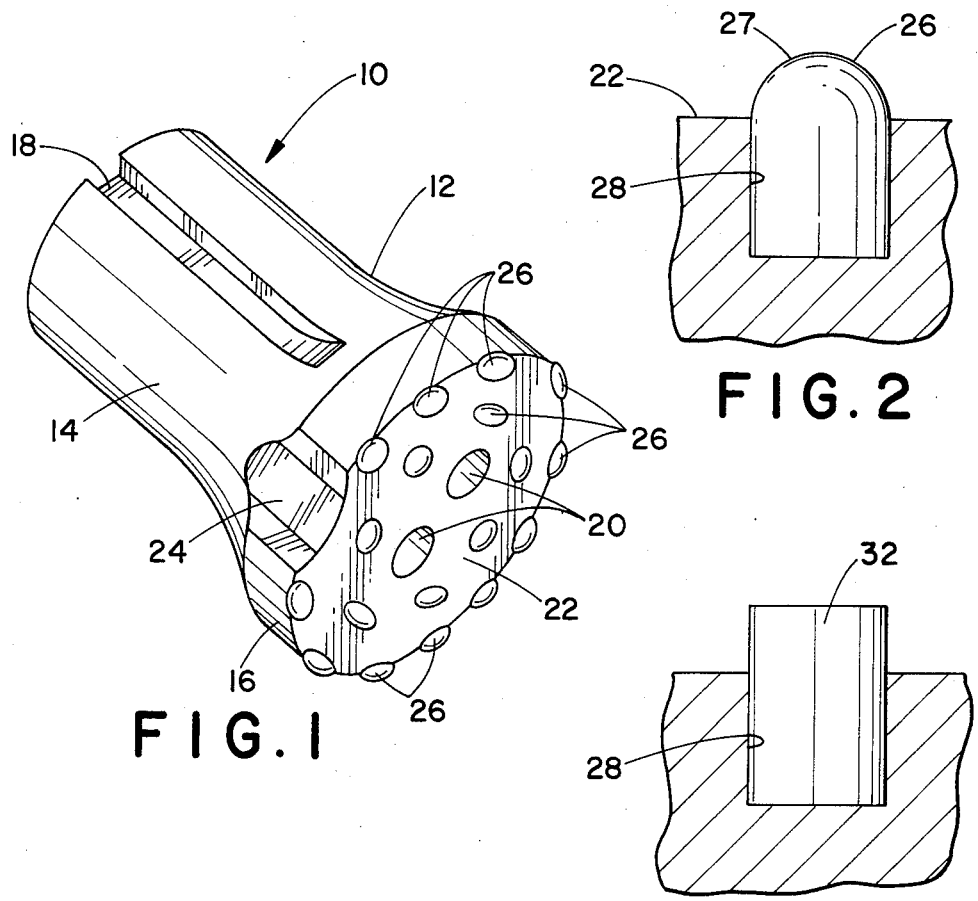
FIG. 1
FIG. 2
FIG. 4
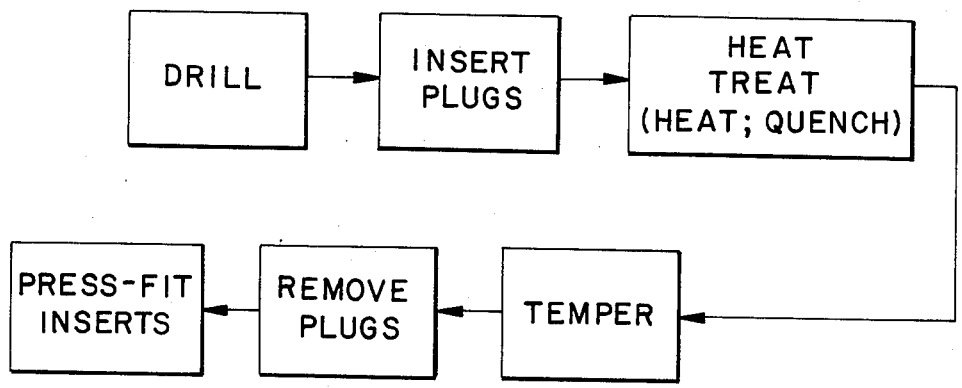
FIG. 3

METHOD OF FORMING CLOSELY SIZED OPENINGS

BACKGROUND OF THE INVENTION

The subject invention is directed generally toward the metal working art and, more particularly, to a method of forming holes or recesses to close tolerances in high hardness steel.

The invention is especially suited for use in manufacturing percussion drilling bits of the types used in rock drilling and mining operations and will be described with particular reference thereto; however, the invention is capable of broader application and could be used to produce roller cone bits, polycrystalline diamond compact (PDC) bits, or similar bits of the type wherein the cutting is performed by hard material inserts carried in a steel body or whenever it is desired to produce a high hardness steel body having closely toleranced holes or recesses formed therein.

One type of bit often used in rock drilling operations comprises a steel drill body having a generally cylindrical shank. The axial end face of the body is provided with a multiplicity of cylindrical openings into which are press-fitted cylindrical inserts of sintered tungsten carbide or the like. The outer ends of the carbide inserts have a generally hemispherical shape and extend outwardly of the end face of the steel body. The inserts perform the actual cutting or drilling of rock through an abrading or localized crushing operation.

As drilling takes place, the inserts are slowly worn away and bit life is generally dictated by the life of the inserts. In certain rock formations, however, the nature of the rock is such that the rock dust and particles generated during the drilling operation erode the face of the steel bit body. This erosion of the body can proceed significantly faster than the wear on the inserts and bit failure takes place not because of insert wear but due to loss of support for the inserts. This wear and loss of support is generally most severe with respect to the outer or "gage row" inserts.

In an effort to overcome the noted problem, various attempts have been made at increasing the hardness of the steel body. However, such attempts have not been commercially successful. For example, heat treating the body to high hardness prior to forming the insert openings makes forming the openings an extremely time consuming operation since conventional drilling, or drilling and boring operations cannot be used. Rather, slower and more expensive processes such as electrical discharge machining and/or grinding must be employed.

Similarly, attempts at forming the insert openings while the steel body is in a soft or fully annealed state and thereafter heat treating the body to high hardness have been unsuccessful. The reason for this has been that the holes do not retain their required tolerances following the heat treating. That is, after heat treating there are found to be relatively wide and varying differences in the diameters of holes which prior to heat treating were of uniform diameter. As a consequence, the carbide inserts cannot be properly press-fitted in the openings.

As is apparent from the foregoing, a distinct need exists for a method of forming the required openings to close tolerances while also providing a drill body of high hardness.

SUMMARY OF INVENTION

According to the subject invention, a method is provided which overcomes the noted problems and allows the economical production of high hardness steel bodies with precision sized openings therein.

In particular, in accordance with one aspect of the invention, the method generally comprises providing a steel body capable of being heat treated to a relatively high level of hardness. While the body is in a machineable hardness range of up to approximately 42 on the Rockwell C scale (HRC), the required openings are formed in the body. Thereafter, plugs having a configuration to fill the formed opening are placed in the openings. Preferably the plugs are formed of a material having a high strength which is retained throughout subsequent heat treating temperatures and a coefficient of thermal expansion which is different than that of the steel body.

With the plugs in place, the steel body is heat treated to take its hardness to a significantly higher level. Following the heat treating, the plugs are removed.

With use of the method described, the resulting openings are found to have a size which is uniform and within desired tolerance ranges. The effect of the plugs is to perform a "sizing" operation on the openings and to hold the openings to a size substantially equal to that of the plugs as the body goes through the normal heat treating steps.

In accordance with a more limited aspect of the invention, the openings are cylindrical and the plugs are press-fitted into the openings while the body is at a first relatively low temperature. Following a heat treating process of heating and quenching, the body, with the plugs in place, is tempered to take the body to a hardness level below maximum hardness but still well above its fully annealed hardness. The plugs are removed following tempering but, preferably, while the body is still at a temperature well above the first relatively low temperature at which they were originally inserted.

As is apparent, the subject method allows the required openings to be formed using conventional drilling or drilling and boring operations while the steel body is in a soft condition. In addition the resulting product has both high hardness and closely toleranced openings ready for further use, such as the press-fitting of inserts, without requiring additional machining or grinding.

Accordingly, a primary object of the invention is the provision of a method of forming products of the type described simply and economically.

Another object is the provision of a method of economically producing percussion-type drill bits and similar drill bits in which the bit body has a high hardness and precision sized insert receiving openings.

A still further object is the provision of a method of the type described which can be practiced using conventional manufacturing and heat treating facilities.

BRIEF DESCRIPTION OF THE DRAWINGS

The above and other objects and advantages of the invention will become apparent from the following description when read in conjunction with the accompanying drawings wherein:

FIG. 1 is a somewhat diagrammatic pictorial view of a drilling tool bit formed in accordance with the preferred embodiment of the subject invention;

FIG. 2 is a cross-sectional view through a portion of the bit of FIG. 1 showing a cutting insert mounted therein;

FIG. 3 is a flow diagram showing the sequence of method steps used in forming the drill bit of FIG. 1; and, FIG. 4 is a cross-sectional view through a portion of the bit body of FIG. 1 showing the plugs used in the method of FIG. 3.

DESCRIPTION OF THE PREFERRED EMBODIMENT

Referring more particularly to the drawings wherein the showings are for the purpose of illustrating a preferred embodiment of the invention only, and not for the purpose of limiting same, FIG. 1 shows, in somewhat diagrammatic pictorial form, a percussion-type rock drill bit 10. The illustrated bit 10 is merely typical of the general class of bits or tools to which the subject method is particularly suited. Broadly, the bit 10 comprises a steel bit body 12 having a mounting shank 14 and an integral head portion 16. As is conventional, the shank 14 has a generally cylindrical configuration and may be provided with one or more slots or spline ways 18 which function to mount the bit in the associated chuck of a pneumatic drill motor, not shown. Such bits normally include longitudinally extending passages 20 to permit air or other pressurized fluid to be supplied to the cutting face 22 of the bit to flush rock dust and particles out of the hole being drilled. Similarly, one or more flushing channels 24 are normally provided about the periphery of the head 16 to allow the flushing air and rock dust and particles to exit upwardly.

The actual cutting or drilling is performed by a multiplicity of hard material cutting inserts 26 press-fitted into precision bored holes formed inwardly of the cutting face 22. Typically, the cutting inserts 26 are formed of sintered tungsten carbide and have a precision ground outer surface of a diameter to be tightly received and held in the openings 28 formed in the cutting face 22. Additionally, as best shown in FIG. 2 the inserts 26 normally have a somewhat domed or semispherical outer end portion 27 which extends beyond the cutting face 22.

As mentioned earlier, the cutting operation is performed by the outwardly extending hard material cutting inserts 26. The bit body primarily functions as a support for the cutting inserts and, normally, the life of the bit is determined by the life of the individual inserts 26. Under certain conditions, however, the bit body 12 is subjected to significant erosion and wearing by the rock dust and particles generated by the cutting operation. In certain rock formations the erosion is such that the bit life is severely limited by such erosion and the body 12 wears away at a rate significantly faster than the inserts resulting in loss of support for the inserts and failure of the bit even though the inserts themselves are still serviceable. To overcome this difficulty it has been desirable to make the drill body 12 as hard as possible to resist this erosive wear. The previous approaches and difficulties encountered in attempting to provide a hard steel bit body 12 have been discussed.

In accordance with the subject invention this problem is overcome by forming the bit 10 in accordance with the sequence of operations generally shown in FIG. 3 and described hereinafter. In particular, according to the preferred embodiment of the subject method, a bit body 12 having the general configuration desired is provided and formed from a steel which is capable of being heat treated to a significantly high hardness level. In the preferred embodiment a steel such as AMS 6418 is used for forming the body 12. Other steels having the same general characteristics, such as AISI 4340, B.S. No. 970EN214, EN27 and EN30 or other alloyed medium carbon steels could also be used within the scope of the subject invention. The steel drill body in its machineable hardness range (e.g. up to approximately 42 HRC) is first drilled to provide the openings 28 in the cutting face 22. The holes 28 are drilled to a nominal size approximately equal to, or preferably fractionally less than, the desired final size used for the inserts 26 which are to be subsequently inserted. For example, holes for the percussion bit of FIG. 1 are drilled at a nominal size of 0.6255 inches.

After the drilling operation is completed, plugs such as a plug 32 (FIG. 4) are press-fitted into the drilled openings 28. The plugs 32 are sized so as to completely fill the openings 28 and require at least some moderate force for the press-fitting step. In the subject embodiment, the plugs range in diameter from 0.6255 to 0.6278 inches. In addition, the plugs are formed from a material which is stronger than the steel of body 12. Preferably, for hot sizing, the material from which the plugs are made should have a coefficient of thermal expansion that is greater than the steel of body 12; however, other materials having high strength but coefficients of thermal expansion lower than the steel of the body can be used. Moreover, it is preferable that the plugs 32 retain their strength throughout the heat treating steps subsequently to be described. Yet another desirable characteristic is to form the plugs of a material that will not metallurgically react with the steel body.

Many different materials could be used for forming the plugs 32. Specifically, however, plugs of sintered tungsten carbide have been used successfully and many commercially available ceramic materials as well as some hardenable high alloy steels could also be used. In still other arrangements, a slurry material, such as a ceramic, can substantially fill the holes and provide hot sizing thereof in a similar manner. As used in this application, the term plug will also encompass a non-rigid material such as a slurry that is placed into the holes for hot sizing.

After the plugs have been inserted into the openings 28 and the entire bit body 12 with the plugs in the openings is heat treated to significantly increase the level of hardness of body 12. Specifically, the body and the plugs are raised in temperature to a point at or above the transformation temperature of the steel forming the body and held there for a period of time and subsequently quenched. Excellent results have been achieved with the AMS 6418 steel mentioned earlier by raising the body and plugs to 1600° F. and holding at that temperature for 2 hours followed by a conventional oil quench.

Subsequent to the heat treating operation it is preferable to temper the entire assembly by raising it to a temperature in the range of 400° F. for a period of 3 hours followed by air cooling.

Following the noted treatment, the resulting steel body 12 has a hardness in the range of 47 to 50 on the Rockwell C scale. After the tempering step the plugs 32 are removed from the openings 28. The resulting openings 28 in the hardened steel body 12 are found to have uniformly constant diameters without the tolerance variations encountered when an attempt was made to harden such bodies without the use of the noted plugs.

In particular, with the starting hole and plug sizes mentioned above, the finished openings are extremely close to the diameter of the plugs.

Removal of the plugs 32 is generally quite simple and often the plugs can merely be manually removed from the body. Under certain circumstances, however, it may be necessary to heat the body up into the 400° tempering range in order to easily extract the plugs. At that temperature the difference in the coefficient of expansion of the plugs and the body facilitates removal of the plugs.

Yet another approach would maintain the holes at the nominal size of 0.6255 inches. Austenitic stainless steel plugs would then be machined to a nominal diameter of 0.6240 inches. Placement of these plugs is easily performed because of the reduced plug diameter. These stainless steel plugs exhibit a lower strength than the steel forming the body at room temperature. Additionally, the stainless steel plugs have a coefficient of thermal expansion greater than the steel body material and the plugs will not metallurgically react with the steel body material.

As the AMS 6418 steel body and stainless steel plugs are raised to a hardening temperature of approximately 1600° F., the strength of the steel body lowers at a faster rate than the strength of the stainless steel plugs. The higher coefficient of expansion of the plugs permits the plugs to expand at an accelerated rate in comparison to the expansion of the steel body. In fact, upon reaching the hardening temperature the stainless steel plugs will have a higher strength than the steel body and sizing will result since the diameter of the plug will be 0.0018 inches larger than the drilled hole diameter. Thereafter, cooling to room temperature reduces the stainless steel plug to its original diametrical dimension of 0.6240 inches. On the other hand, the drilled hole in the steel body has been hot sized to 0.6273 inches, thus facilitating ease of removal of the plugs.

With the plugs removed and the drill body 12 in the high hardness condition, the drilling inserts 26 can be press-fitted into the openings in the usual manner. The resulting drill bit 10 thus has a full hard drill shank and head with the inserts 26 firmly mounted therein. The method thus allows this desired combination to be achieved without the necessity of machining or grinding the openings 28 in the body while it is in the hard condition.

The invention has been described with reference to preferred and alternate embodiments. Obviously, modifications and alterations will occur to others upon the reading and understanding of this specification. It is intended to include all such modifications and alterations insofar as they come within the scope of the appended claims or the equivalents thereof.

Having thus described the invention, it is now claimed:

1. A method of forming at least one closely toleranced opening in a hardened steel body comprising the steps of:
   (a) providing a body formed of a steel capable of being hardened;
   (b) while said steel body is in a soft condition, forming an opening therein;
   (c) providing a plug formed from a material having a coefficient of thermal expansion less than said steel body, said plug being stronger than said steel body through a temperature range;
   (d) placing said plug in said opening;
   (e) heat treating said steel body through said temperature range with said plug in said opening to significantly increase the hardness of said steel body; and thereafter,
   (f) removing said plug.

2. The method as defined in claim 1 wherein said plug is press-fitted in said opening.

3. The method as defined in claim 1 wherein said steel body is tempered prior to removing said plug.

4. The method as defined in claim 3 wherein said plug is removed while said steel body is at a temperature above the temperature at which it was when said plug was originally fitted in said opening.

5. The method as defined in claim 1 wherein said steel body with the plug in said opening is heat treated by raising the temperature of said steel body and said plug to a level at or above the transformation range of said steel body and thereafter quenching said steel body.

6. The method as defined in claim 1 wherein said plug is formed from sintered tungsten carbide.

7. The method as defined in claim 1 wherein said plug is formed of a material which will not metallurgically react with said steel body during said heat treating step.

8. The method of making a tool bit for rock drilling comprising the steps of:
   (a) providing a tool bit body formed from a steel capable of being heat treated to raise its hardness to a relatively high level, said bit body having a cutting face surface;
   (b) while said bit body is in a soft condition forming a plurality of openings extending into said cutting face surface;
   (c) placing a plug formed from a material different than the steel forming said bit body into each said openings with each plug having a coefficient of thermal expansion different than the bit body;
   (d) heat treating said bit body with said plugs therein to significantly raise the level of hardness of said bit body; and thereafter,
   (e) removing said plugs and press-fitting hard cutting inserts into said openings, each such insert being sized to have a cutting end portion extending outwardly of said cutting face.

9. The method as defined in claim 8 wherein said plugs are inserted into said bit body at a first relatively low temperature and are removed from said body at a temperature above said first temperature but below the maximum temperature of said heat treating step.

10. The method as defined in claim 8 wherein said openings are cylindrical and wherein said plugs have a uniform diameter slightly greater than the diameters of said openings.

11. The method as defined in claim 10 wherein said plugs are formed from a material having a coefficient of thermal expansion lower than the steel forming said bit body.

12. The method as defined in claim 8 wherein said openings are cylindrical and wherein said plugs have a uniform diameter slightly less than the diameter of said openings.

13. The method as defined in claim 12 wherein said plugs are formed from a material having a coefficient of thermal expansion greater than the steel forming said bit body.

14. The method as defined in claim 8 wherein said plugs are a rigid material when inserted into said openings.

15. The method as defined in claim 8 wherein said plugs have a strength less than the steel forming the bit body at room temperature and a strength greater than the steel forming the bit body at an elevated bit body hardening temperature.

* * * * *